(12) United States Patent
Stalder et al.

(10) Patent No.: US 6,322,353 B1
(45) Date of Patent: Nov. 27, 2001

(54) IGNITION APPLIANCE FOR A HEAT GENERATOR

(75) Inventors: Marcel Stalder, Klingnau; Günter Sybon, Gebenstorf, both of (CH)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/397,511

(22) Filed: Sep. 17, 1999

(30) Foreign Application Priority Data

Oct. 5, 1998 (EP) .................................. 98810998

(51) Int. Cl.$^7$ ...................................... F02C 7/264
(52) U.S. Cl. .................. 431/263; 431/158; 431/353; 60/39.821
(58) Field of Search .................... 431/263, 158, 431/189, 91 A, 353, 8; 60/39.822, 723, 39.826, 39.828, 39.821

(56) References Cited

U.S. PATENT DOCUMENTS

| | | | |
|---|---|---|---|
| 2,967,224 | * | 1/1961 | Irwin ..................... 431/263 |
| 3,304,988 | * | 2/1967 | Rackley ................. 431/263 |
| 3,397,536 | * | 8/1968 | Davies et al. .......... 431/263 |
| 3,404,939 | * | 10/1968 | Saha ....................... 431/263 |
| 3,589,845 | * | 6/1971 | Morse et al. .......... 431/263 |
| 3,852,024 | * | 12/1974 | Carlsson ................ 431/263 |
| 4,047,880 | * | 9/1977 | Caldarelli ............ 60/39.822 |
| 4,900,246 | * | 2/1990 | Schirmer et al. ....... 431/10 |
| 5,344,310 | * | 9/1994 | Harbeck et al. ...... 431/158 |
| 5,346,390 | * | 9/1994 | Slavejkov et al. ...... 431/8 |
| 5,368,474 | * | 11/1994 | Welden ................. 431/263 |
| 5,460,515 | * | 10/1995 | Harbeck et al. ...... 431/263 |
| 5,513,981 | * | 5/1996 | Harbeck et al. ...... 431/263 |
| 5,643,544 | * | 7/1997 | Henkelmann ........... 431/5 |

* cited by examiner

Primary Examiner—Ira S. Lazarus
Assistant Examiner—Josiah C. Cocks
(74) Attorney, Agent, or Firm—Burns, Doane, Swecker & Mathis, L.L.P.

(57) ABSTRACT

In an ignition appliance for a heat generator, the supply lines for air (70) and fuel gas (60) are led directly into a flame tube (40). The igniter (51) is arranged in an ignition space (50) remote from the flame tube (40) and connected to the flame tube (40). The ignition space (50) is connected to the air supply passage (70) and the gas supply passage (60) via connecting ducts (55, 56). If the supply passages for air and fuel gas (70, 60) are dimensioned so as to be sufficiently large, the pressure drop between the inside of the ignition space (50) and the feed lines (60, 70) is small. The fuel/air ratio present at the igniter (51) is therefore essentially determined only by the ratio of the cross sections of the connecting ducts (55, 56). The flow relationships in the ignition space (50) are likewise substantially decoupled from the air and fuel gas flows supplied overall to the ignition appliance. In consequence, good conditions for a reliable ignition can be set over a wide operating range of the ignition appliance.

8 Claims, 2 Drawing Sheets

IGNITION APPLIANCE FOR A HEAT GENERATOR

BACKGROUND OF THE INVENTION

1. Field of the Invention

The present invention relates to an ignition appliance for a heat generator, comprising a fuel gas supply passage, an air supply passage, a flame tube and an igniter, the igniter being arranged in an ignition space through which flow occurs and which is spatially remote from the flame tube, which ignition space opens into the flame tube.

2. Discussion of Background

The ignition of flames in heat generators, as for example in gas turbine combustion chambers, can take place for example by means of an igniter plug or a glow plug, as described inter alia by A. Lefebvre in "Gas Turbine Combustion" (Arthur H. Lefebvre: *Gas Turbine Combustion*, Hemisphere Publishing Corporation, 1983).

An obvious precondition for the function of the ignition appliance is that conditions are present at the igniter which are essential for a stable and sufficiently powerful ignition flame to occur in the first place. In this connection, particular mention should be made of the setting of the fuel/air ratio at the igniter and of an appropriate flow velocity in the region of the igniter.

These requirements can often only be satisfied by the employment of special ignition burners, particularly in the combustion chambers of gas turbines. Placing the igniter directly in the combustion space is intrinsically ruled out by the criteria mentioned above. The igniter is therefore frequently accommodated in a small ignition space so that only a small volume has to be ignited by the initial ignition. A stable ignition flame occurs in succession in a flame tube located downstream of this ignition space. Even then, satisfactory results are often only obtained with substantial complication, for example by the employment of ignition gas supply systems fed with propane gas.

If, on the other hand, direct ignition is to take place with natural gas or even with low calorific value gases, the range of fuel/air ratios in which a reliable function is ensured is very tightly limited. The gas supply and air supply to the igniter must correspondingly have very tight tolerances and the upstream gas pressure must be carefully matched.

Under the conditions which are present in the combustion chambers of modern gas turbines, the ignition systems demand a high level of maintenance in order to maintain their reliable function over a long period of time.

SUMMARY OF THE INVENTION

The invention is intended to provide help on this point. Accordingly, one object of the invention is to ensure good ignition conditions, even without ensuring compliance with very close tolerances in the supply ducts for fuel gas and air, in the case of an ignition appliance for a heat generator, comprising a fuel gas supply passage, an air supply passage, a flame tube and an igniter, the igniter being arranged in an ignition space through which flow occurs and which is spatially remote from the flame tube, which ignition space opens into the flame tube.

In accordance with the invention, this object is achieved by having the fuel gas supply passage and air supply passage open into the flame tube, and by the ignition space being connected by at least one connecting duct to the fuel gas supply passage and the air supply passage.

By means of this embodiment, the air and fuel supply to the igniter itself can be effectively decoupled from that of the overall ignition device because if the cross sections of gas lines and air lines are selected to be sufficiently large, the result is a small respective pressure drop between the supply lines and the flame tube and ignition space. Because of this, however, the pressure drops over the connecting ducts between the ignition space and the supply passages for air and fuel gas are also almost equal, and small. Because of the small pressure drop, the cross sections of the connecting ducts can be selected to be large without the flow velocity in the environment of the igniter increasing to more than a permissible and desirable amount. As a consequence, the sensitivity of the mass flows transmitted to manufacturing tolerances is reduced. Because the pressure drops over all the connecting ducts are not significantly different, on the other hand, the fuel/air ratio in the ignition space is essentially determined only by the ratio of the cross sections of the connecting ducts for air and fuel gas.

The possibility of influencing the flow through the ignition space on a sustained basis by means of a nozzle-shaped or diffuser-shaped geometry of the openings for the fuel gas supply passage and the air supply passage can be readily implemented by the specialist.

The flow of air and fuel gas around the igniter is effectively decoupled, from parameters such as pressure in the combustion space and the upstream pressure of air and fuel gas, by the embodiment of an ignition device according to the invention. In consequence, good ignition conditions can be ensured immediately at the igniter over a wide operating range of the ignition device.

It should also be noted that the igniter itself only has to ignite a small volume of mixture. In consequence, the minimum energy needed for reliable initial ignition is reduced. The pilot flame occurring in this way emerges from the ignition space into the flame tube, where it ignites the fuel/air mixture present there so that, finally, the actual ignition flame for the complete combustion space is generated.

The intensity of the pilot flame can, in addition, also be influenced by a corresponding shaping of the ignition space and the connecting ducts to the same, as is explained in the following embodiment example.

BRIEF DESCRIPTION OF THE DRAWING

A more complete appreciation of the invention and many of the attendant advantages thereof will be readily obtained as the same becomes better understood by reference to the following detailed description, when considered in connection with the accompanying drawings, wherein:

FIG. 2 and show further examples of the

DESCRIPTION OF THE PREFERRED EMBODIMENTS

Figure 1:
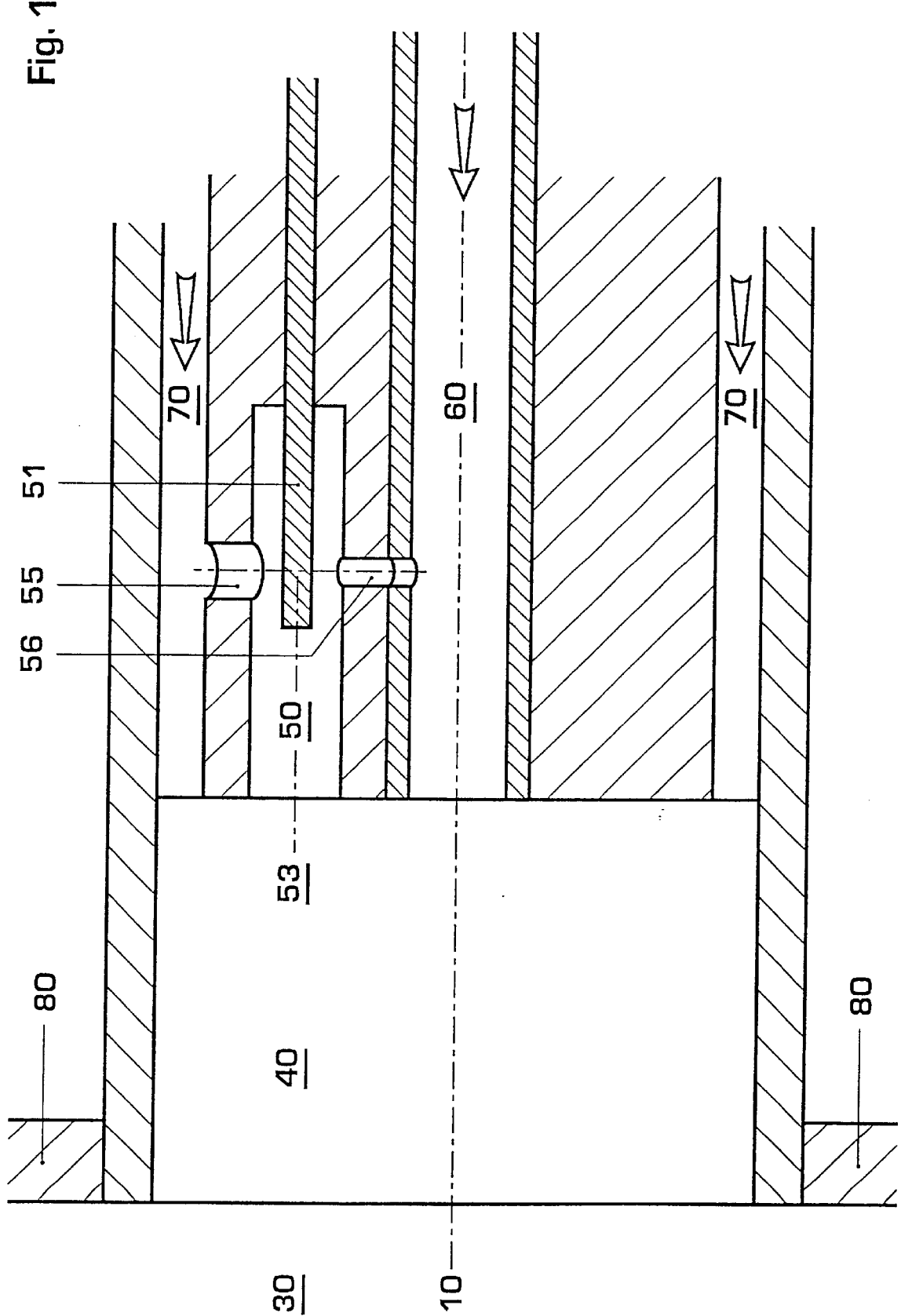
FIG. 1 shows an example of the embodiment, according to the invention, of an ignition device with all the essential features.

Referring now to the drawings, wherein like reference numerals designate identical or corresponding parts throughout the views, an example for an ignition device according to the invention is shown in FIG. 1. The ignition device is mounted on the wall 80 of a combustion space. The flame tube 40 is open toward the inside of the combustion space 30. Fuel gas is supplied to the flame tube via one or a plurality of fuel gas lines 60, whereas the air supply takes place via the ducts 70. The ignition space 50, within which the igniter 51 is arranged, is located on the end surface of the flame tube 40. The ignition space 50 is connected to the air supply passage 70 and the fuel gas supply passage 60 by at least one connecting duct 55, 56. The connecting ducts 55, 56 can, of course, also have a lateral offset or make an angle with the center line 53 of the ignition space 50 in order to generate an appropriate flow field in the ignition space.

When the fuel gas and air supply passages 60, 70, are subjected to fuel gas and air, the major portion of these flows enter the flame tube 40. A partial flow of each medium flows through the supply openings 55, 56 into the ignition space 50 and can there be ignited by means of the igniter 51, for example an igniter plug. It is only necessary for a relatively small quantity of combustible mixture to be ignited initially in the ignition space 50, it being possible to set a stoichiometric value for the mixture present in the ignition space, independently of other parameters, by the ratio of the cross sections of the supply openings 55, 56. In addition, the flow velocity in the ignition space 50 is also relatively low. In consequence, reliable ignition is achieved even with low ignition energies. The pilot flame produced in this way, whose intensity can be influenced by the geometry of the ignition space, emerges from the ignition space 50 into the flame tube 40. The fuel gas located there is reliably ignited by the pilot flame over a concentration range which is essentially larger than would be the case if only the small ignition energy, generated for example by an igniter plug or glow plug, were available here. The actual ignition flame is now generated in the flame tube 40 and this ignition flame emerges into the combustion space 30 with an intensity sufficient to there ensure reliable ignition in the entire heat generator by transverse ignition to other burners.

The arrangement of the fuel gas and air supply shown in FIG. 1 should not, under any circumstances, be understood as being limiting. Thus the fuel gas supply passage 60 can also be arranged decentrally or, should this be found to be appropriate, a plurality of fuel gas supply passages can also be arranged centrally or decentrally and also at an angle relative to the center line 10 of the ignition appliance. An analogous statement obviously also applies to the air supply passages 70. In the case of the separate air supply and fuel supply shown, on the other hand, it is appropriate to have the ignition space 50 opening into the flame tube between the openings of a fuel gas supply passage 60 and an air supply passage 70. Because of the gradient in the fuel/air ratio present there, the pilot flame impinges with certainty on a region in which a particularly ignitable mixture is present. Reliable ignition is achieved, by means of this functional principle, over a particularly wide range of the fuel/air ratio of the ignition device.

Figure 2:
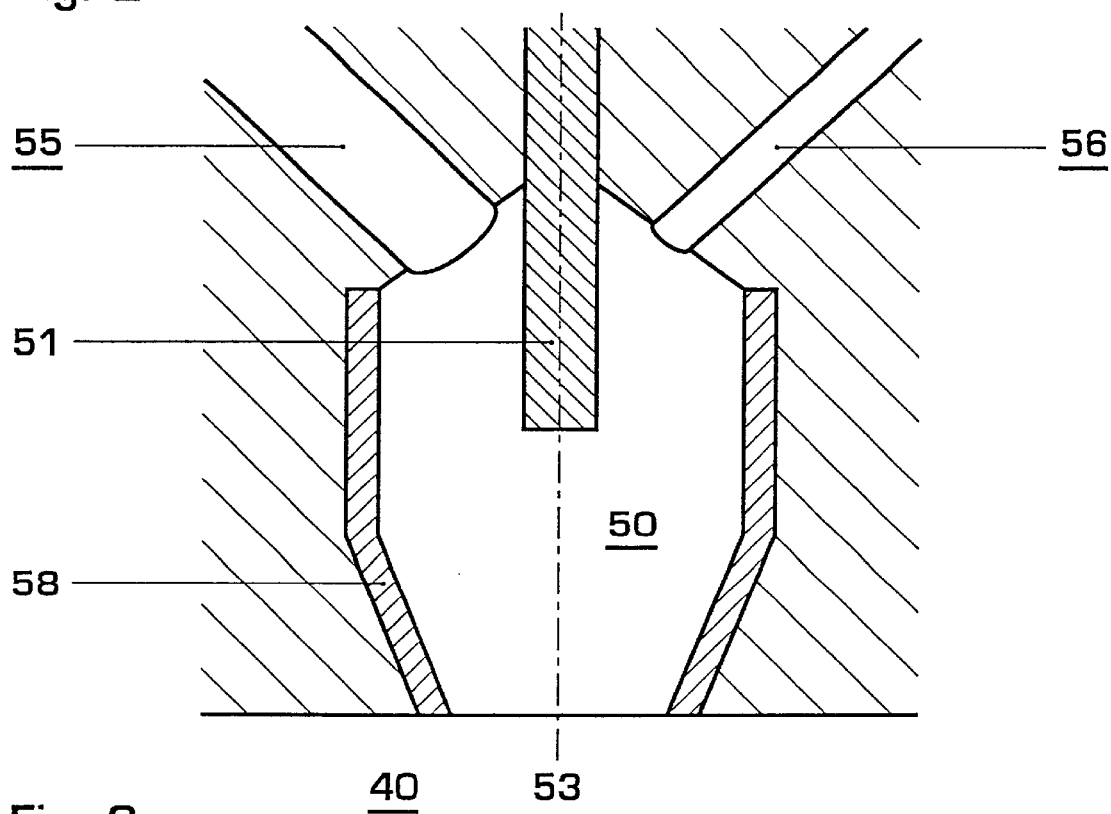
Figure 3:
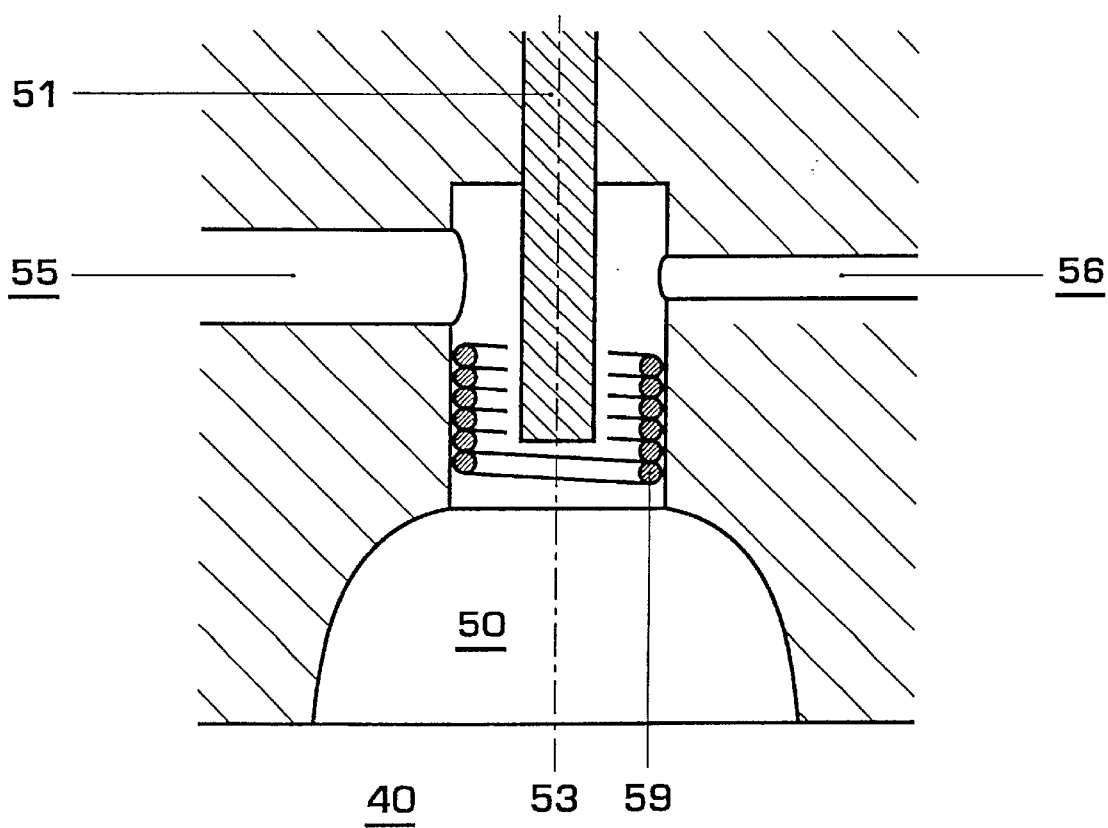
FIG. 3 configuration of the ignition space.

The cylindrical shape of the ignition space shown in FIG. 1 is likewise not imperative; as indicated above, it is possible on the contrary, to influence the pilot flame by the configuration of the ignition space. In the case of the geometry shown in FIG. 2, the mixture volume ignited is, in addition, markedly increased relative to the surface area, so that the heat losses to the cold walls are reduced. The use of a thermal insulation layer 58 on the wall of the ignition space also has a supporting effect. In the extreme case, it would be likewise conceivable to preheat the relatively small wall surfaces of the ignition space. This possibility is indicated in FIG. 3 by a heating coil 59.

The cylindrical shape shown for the flame tube 40 is not imperative either; different geometries of the same can be found to be appropriate.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An ignition appliance for a heat generator, comprising:
   an ignition space;
   an ignitor located inside said ignition space;
   a flame tube, said flame tube having an unrestricted opening towards a combustion space of the heat generator;
   a fuel supply passage and an air supply passage, said fuel supply passage and said air supply passage being in fluid communication with the flame tube through unrestricted openings;
   wherein said ignition space is arranged spatially apart from the flame tube, and said ignition space is in fluid communication with the flame tube, and wherein the ignition space is in fluid communication with the fuel gas supply passage and with the air supply passage by at least one respective duct, the connection of the ignition space to the flame is arranged between the opening of the gas supply passage and the opening of the air supply passage into the flame tube.

2. The ignition appliance as claimed in claim 1, wherein the ignition space is lined with a heat insulating layer.

3. The ignition appliance as claimed in claim 1, wherein the ignition space is provided with a preheating device.

4. The ignition appliance as claimed in claim 1, wherein the air supply passage is configured as an annular gap surrounding the gas supply passage and the ignition space.

5. An ignition appliance for a heat generator, comprising:
   an ignition space;
   an ignitor located inside said ignition space;
   a flame tube, said flame tube having an unrestricted opening towards a combustion space of the heat generator;
   one or more fuel gas supply passages and a plurality of air supply passages, said one or more fuel supply passages and said plurality of air supply passages being in fluid communication with the flame tube through unrestricted openings;
   wherein said ignition space is arranged spatially apart from the flame tube, and said ignition space is in fluid communication with the flame tube, and wherein the ignition space is in fluid communication with said one or more fuel gas supply passages and with said plurality of air supply passages by at least one respective duct.

6. The ignition appliance as claimed in claim 5, wherein the ignition space is lined with a heat insulating layer.

7. The ignition appliance as claimed in claim 5, wherein the ignition space is provided with a preheating device.

8. The ignition appliance as claimed in claim 5, wherein the air supply passage is configured as an annular gap surrounding the gas supply passage and the ignition space.

* * * * *